United States Patent Office 3,439,499
Patented Apr. 22, 1969

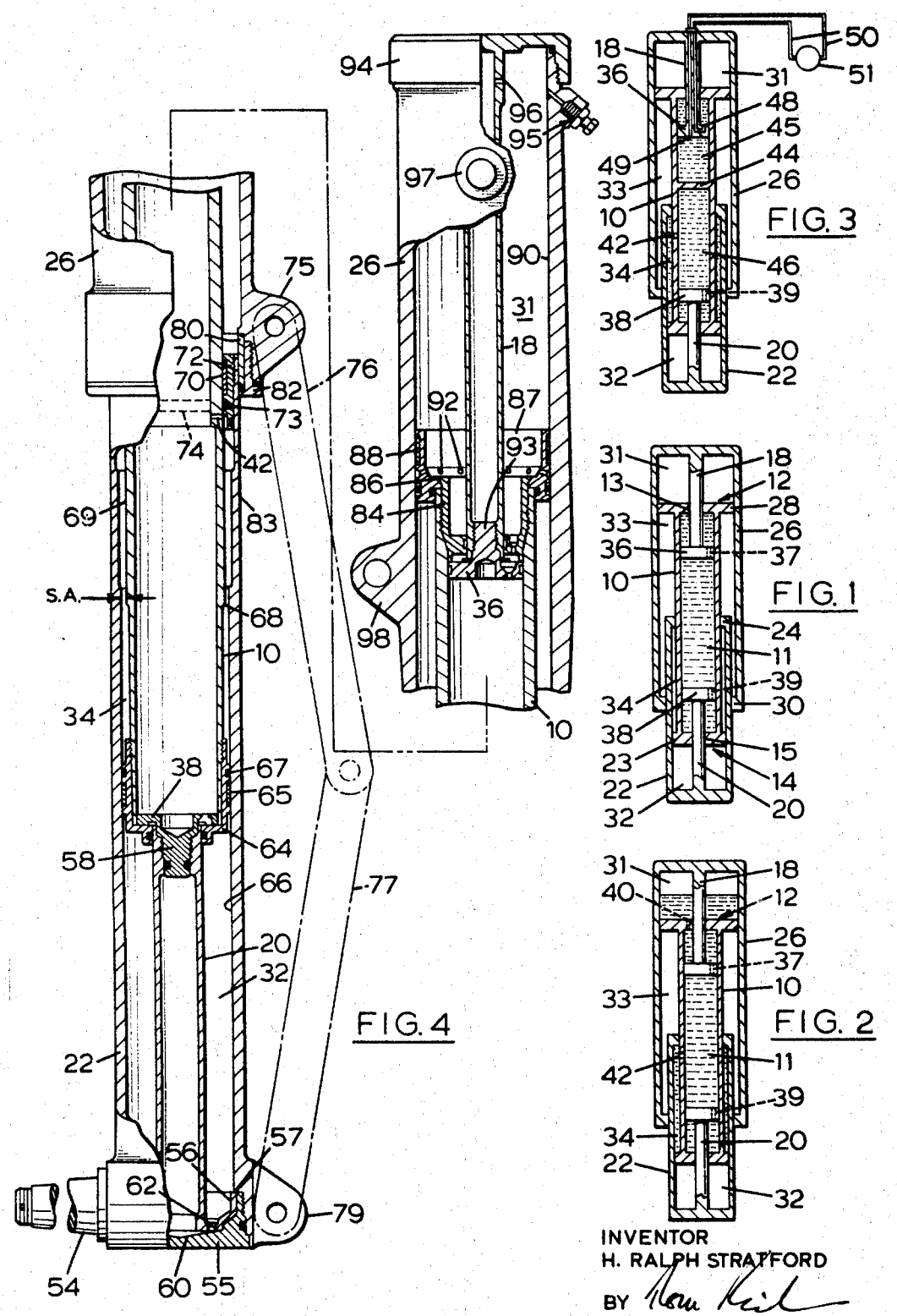

3,439,499
SHOCK ABSORBER
Henry Ralph Stratford, Whitby, Ontario, Canada, assignor to York Gears Limited, Toronto, Ontario, Canada
Filed Feb. 13, 1967, Ser. No. 615,768
Int. Cl. F15b 7/00
U.S. Cl. 60—54.5     15 Claims

ABSTRACT OF THE DISCLOSURE

A shock absorber consisting of an inner cylinder, a first outer cylinder slidingly mounted over one end of the inner cylinder, and a second outer cylinder slidingly mounted over the other end of the inner cylinder and also encompassing part of the first outer cylinder. All three cylinders are adapted to telescope with respect to each other and the outer cylinders are rigidly connected to respective pistons within the inner cylinder, which contains a liquid such as oil. The pistons have restricted orifices which function as dashpots within the liquid.

---

This invention relates to shock absorbers. More particularly, this invention has to do with shock obsorbers having a velocity-sensitive characteristic by virtue of utilizing the dashpot effect obtained by forcing liquid through a restricted orifice. Such shock absorbers usually have a displacement-sensitive resistance to closure operating in conjunction with the velocity-sensitive resistance to closure.

Shock absorbers which make use of both velocity-sensitive and displacement-sensitive resistance to closure usually employ either (a) compressed air or other gas for the displacement-sensitive resistance, and oil as the liquid which is forced through one or more restricted orifices to provide the velocity-sensitive resistance, these thus being known as oleopneumatic shock absorbers; or (b) a suitable liquid which is forced through one or more orifices for the velocity-sensitive resistance, and possesses a bulk modulus of elasticity such that its compression constitutes the displacement-sensitive resistance, these thus being known as liquid compression shock absorbers. Hereinafter the terms oleopneumatic shock absorber and liquid compression shock absorber will represent the above descriptions.

One object of this invention is to provide a velocity-sensitive and displacement-sensitive shock absorber with a high ratio of open length to closed length.

Another object of this invention is to provide a basic shock absorber with internally adjustable open length.

Accordingly, this invention provides a shock absorber comprising: an enclosure defining an elongate chamber having a first aperture through one end and second aperture through the other end, a first rod extending into said chamber through said first aperture and a second rod extending into said chamber through said second aperture, a first member attached to said first rod and mounted on said enclosure for rectilinear reciprocation with respect thereto in a direction parallel to the axis of said first rod, the first rod being in sealed but sliding relation with said first aperture, a second member attached to said second rod and mounted on said enclosure for rectilinear reciprocation with respect thereto in a direction parallel to the axis of said second rod, one of said members being mounted to envelop partially and contact slidingly the other of said members, the mounting of said members and said enclosure being such as to resist lateral bending, a first head secured to said first rod inside the chamber and fitting snugly but slidably therewithin, a second head secured to said second rod inside the chamber and fitting snugly but slidably therewithin, a liquid medium filling said chamber, a restricted orifice in said first head, said second head having means permitting longitudinal displacement of the second head and thus of the second member with respect to the chamber.

Three embodiments of this invention are shown in the accompanying drawings, in which like numerals refer to like parts throughout the several views, and in which:

FIGURES 1, 2 and 3 are schematic axial sectional views of three embodiments of this invention; and FIGURE 4 is a discontinuous axial sectional view of the embodiment of this invention shown schematically in FIGURE 2.

The most simplified embodiment of this invention is of the liquid compression shock absorber type, and is shown in FIGURE 1, to which attention is directed. The shock absorber shown in axial section in FIGURE 1 includes a cylindrical enclosure 10 defining an elongate chamber 11 which is closed at one end 12 except for an aperture 13 and is closed at the other end 14 except for an aperture 15. A rod 18 extends slidably into the chamber 11 through the aperture 13 is sealed relation therewith, while a rod 20 extends slidably into the chamber 11 through the other aperture 15 in sealed relation therewith. An inside cylindrical member 22 is attached to the rod 20 at its outer extremity and is mounted on the enclosure 10 for rectilinear reciprocation with respect to the enclosure in a direction parallel to the axis of the rod 20. The mounting of the inside cylindrical member 22 on the enclosure 10 is such as to resist lateral bending, by virtue of two axially spaced bearing members between the enclosure 10 and the inside cylindrical member 22. The first of these is an outwardly extending bearing member 23 in the form of a flange on the lower end of the enclosure 10. The outer cylindrical surface of the bearing member 23 is adapted to slide along the cylindrical inside wall of the inside cylindrical member 22. A second bearing member 24 projects inwardly as a flange at the upper end of the inside cylindrical member 22. The inside cylindrical surface of the bearing member 24 is adapted to bear against the outside cylindrical surface of the enclosure 10.

An outside member 26 is attached to the rod 18 at its outer extremity and is mounted on both the enclosure 10 and the inside cylindrical member 22 for rectilinear reciprocation with respect to the enclosure 10 in a direction parallel to the axis of the rod 18. It will be appreciated that, in the FIGURE 1 view, the rods 18 and 20 are parallel and collinear, and this will usually be the case. However, it is conceivable that certain applications would call for the rods 18 and 20 to be out of alignment and this alternative will fall within the ambit of this invention. The mounting of the outside member 26 on both the enclosure 10 and the inside cylindrical member 22 is such as to resist lateral bending, by virtue of two axially spaced bearing members between them. The first of these is an outwardly projecting bearing member 28 located at the top of the enclosure 10. The second bearing member is an inwardly projecting member 30 at the lower end of the outside cylindrical member 26. It will be noted that the outside cylindrical bearing surface of the flange 28 slides along the inside cylindrical wall of the outer cylindrical member 26, while the inside cylindrical bearing surface of the flange 30 slides along the outside surface of the inside cylindrical member 22.

It will be noted that the outside member 26 and the enclosure 10 define between them a cavity 31 of which the volume changes in accordance with the relative positions of the member 26 and the enclosure 10. In a like manner, the inside cylindrical member 22 and the enclosure 10 define between them a cavity 32 of which the volume changes in accordance with the relative positions of the member 22 and the enclosure 10. It will further be noted that an annular space 33 and an annular space 34 are also defined between the members 22 and 26 and the enclosure 10. The volume of the annular spaces 33 and 34 will also be governed by the relative positions of the enclosure 10 and the members 22 and 26.

Mounted on the inner end of the rod 18 is a head 36 having a restricted orifice 37 therethrough. Mounted on the inner end of the rod 20 is a head 38 having a restricted orifice 39 therethrough.

In this first embodiment, it is contemplated to vent the cavities 31 and 32 and the annular spaces 33 and 34 to each other in any combination and to the atmosphere, and to fill the cavity 11 entirely with oil. Oil being highly resistant to compression but not entirely so, sufficient inward force on the ends of the shock absorber (that is, on the outer ends of members 22 and 26) will slide the members 22 and 26 inwardly with respect to the enclosure 10, thereby sliding rods 20 and 18 and heads 36 and 38 toward each other inside the enclosure 10. It will be appreciated that, due to the relatively small compressibility of oil, the rods 20 and 18 will have to be of relatively small diameter to permit their entry into the cavity 11, since their entry will displace a certain amount of oil which must be absorbed into the main body of the oil. However, it is known that if the parts of the shock absorber are properly dimensioned, the compressibility of the oil in the chamber 11 can be utilized to provide the displacement-sensitive resistance to closure, by virtue of its resisting the entry of the rods 15 and 18 into the chamber 11. The velocity-sensitive resistance to closure is obtained by virtue of the restricted orifices 37 and 39 in the heads 36 and 38. The faster the members 26 and 22 move toward each other around the enclosure 10, the greater will be the resistance to their movement, because it takes a greater force to move oil through the restricted orifices 37 and 39 at a higher speed than it does to move the oil through at a lower speed.

Turning now to FIGURE 2, which shows the second embodiment of this invention, which is of the oleopneumatic shock absorber type it will be seen that the basic components described with reference to FIGURE 1 remain unchanged. Additionally, there is provided an orifice 40 in the end 12 of the enclosure 10 which may afford more or less restriction to flow, and a relatively unrestricted orifice 42 in the wall of the enclosure 10 at a position where it communicates the chamber 11 with the annular space 34. In this embodiment, the swept area of the annular space 34 is designed to be substantially the same as the cross-sectional area of the rod 15. By "swept area" is meant the area which, multiplied by a given axial displacement $d$, will give a volume $V$ which is the same as the change in the volume of the annular space 34 resulting from the displacement $d$. In the simplified structure shown in FIGURE 2, of course, the "swept area" is simply the difference between the inside cross-sectional area of the member 22 and the outside cross-sectional area of the enclosure 10. With the annular space 34 so dimensioned, the increase in volume of the space 34 as the member 22 moves upwardly with respect to the enclosure 10 will be substantially the same as the volume of oil displaced by the entry of the rod 15 into the chamber 11. The unrestricted orifice 42 permits the oil displaced from the chamber 11 by entry of the rod 15 to pass into the annular space 34, whose volume is increasing at a rate just sufficient to accommodate the displaced oil.

The oil displaced from chamber 11 by the rod 18 passes out of the chamber by way of the orifice 40 into the cavity 31, which is partially filled with oil even when the outer cylindrical member 26 is in its outermost position with respect to the enclosure 10. The remainder of the cavity 31 contains air under pressure, as does the cavity 32, and the resilient compressibilty of the air in cavities 31 and 32 provides the above-mentioned displacement-sensitive resistance to closure of the oleopneumatic shock absorber in FIGURE 2. The velocity-sensitive resistance to closure is provided by the restricted orifices 37 and 39. The space 33 is vented to the atmosphere.

The third embodiment of this invention is shown in FIGURE 3 to which attention is now directed. In this embodiment, a substantially imperforate septum 44 is secured inside the enclosure 10 intermediate the heads 36 and 38, and thus divides the chamber 11 into two sub-chambers 45 and 46 each containing one of the heads. The head 38, the restricted orifice 39, the rod 20, the annular space 34 and the orifice 42 are exactly as described above with respect to FIGURE 2. The orifice 42 provides communication between sub-chamber 46 and the annular space 34.

In the upper sub-chamber 45, which does not communicate with the cavity 31 in this embodiment, the head 36 is equipped not with a restricted orifice as in the first two embodiments, but rather with two non-communicating ports 48 and 49 opening into the sub-chamber 45 from opposite sides of the head 36. Cavity 31 is vented directly to atmosphere or indirectly by being vented to space 33 which is itself vented to atmosphere. Each port 48 and 49 is connected by a separate fluid line 50 to the ports of a fluid power source 51, which is capable of reversing its direction of action. That is, the fluid power source 51 can, upon selection, either deliver fluid to port 48 and withdraw fluid from port 49, or vice versa. When fluid is being delivered to port 48 and withdrawn from port 49, the head 36, the rod 18 and the member 26 will move inwardly (downwardly) with respect to the enclosure 10. When the fluid flow in the ports 48 and 49 is reversed, the member 26 will move outwardly with respect to the enclosure 10.

The fluid power source 51 can consist, for example, of an ordinary pump in conjunction with a reversing valve capable of switching the connection of the lines 50 between the suction and delivery of the pump. The fluid power source 51 is operated only to adjust the position of the member 26 with respect to the enclosure 10. When the adjustment has been made, these latter two are locked into position. This may be achieved by stopping up the lines 50 using any known valve arrangement, preferably one designed into the reversing valve.

As it is normally desired both in this embodiment and the one shown in FIGURE 2, that the lower member 22 achieve its maximum displacement relative to enclosure 10 when no compressive force is applied to the shock absorber, it will normally be necessary for the cavity 32 to contain compressed gas, since with the swept area of annular space 34 equalling the area of rod 18, even when the oil is pressurized no extending force results. However, it is possible in both embodiments, should the need occur, for the gas pressure in cavity 32 to be reduced or eliminated, without compromise to the function of the remainder of the shock absorber.

Attention is now directed to FIGURE 4, which is a more detailed drawing of the oleopneumatic shock absorber represented schematically in FIGURE 2. Where appropriate, the same numerals will be used to describe the different parts in FIGURE 4 as were used in FIGURES 1, 2 and 3.

FIGURE 4 shows the oleopneumatic shock absorber at its greatest elongation, that is, with the heads 36 and 38 at the extremities of the enclosure 10. Beginning now at the lower end of the FIGURE 4 shock absorber, the inner cylindrical member 22 is formed with an integral boss 54 upon which, for example, an aeroplane wheel (not shown) can be mounted. In FIGURE 4, the member 22 is not integral with the rod 20. Rather, the member 22 is formed with an open lower end which is internally threaded to receive a threaded plug 55. The plug locks a flange 56 against a shoulder 57 of the member 22, the flange 56 being formed integrally with the rod 20. The rod 20 itself is hollow and is internally threaded at its upper end to receive the threaded stem 58 of the head 38. The plug 55 has a conical recess 60 which permits free communication between the interior of the hollow rod 20 and the cavity 32 by way of a plurality of un-restricted apertures 62 formed in the flange 56 adjacent the hollow rod 20 (only one aperture 62 shown).

Turning now to the enclosure 10, it will be noted that its lower end is threadedly engaged with a cap 64 which has an exterior annular gallery to receive the annular bearing 65. The latters bears against the cylindrical inner wall 66 of the member 22. Sealing means 67, for example an O-ring, is provided adjacent the annular bearing 65. Where, in the appended claims, the term "bearing member" is employed, it is to be construed broadly enough to include the actual bearing and the sealing means, if the latter is required. At a shoulder 68 part way up the enclosure 10, the outer surface of the latter widens (for structural reasons) to form the cylindrical outer wall 69 against which a bearing 70 slides, the bearing 70 being received in an inner gallery of a threaded insert 72 adapted to be threaded into the upper end of the member 22, as shown. Sealing means 73, for example an O-ring, is provided adjacent the bearing 70.

Although the embodiment shown in FIGURE 4 is intended to be similar to that of FIGURE 2, there is shown in dotted lines the location at which a substantially imperforate septum 74 would be positioned within the enclosure 10, were it desired to make the FIGURE 3 embodiment.

It will be noted that the inner wall of the member 22 undergoes a stepwise enlargement in the annular space 34, and this, coupled with the one-step enlargement of the outer wall of the enclosure 10 in the same region, may cause confusion with respect to the "swept area" of the annular space 34. In the FIGURE 4 design, the "swept area" is calculated as the cross-sectional area of the inside wall 66 of the member 22 less the cross-sectional area of the outside wall 69 of the enclosure 10. The "swept area" is thus the area of the annulus shown by the arrows marked "S.A."

Turning now to the outside member 26, it will be noted that the lower end is formed with an appendage 75 to which is freely pivoted a first connecting arm 76. The other end of the first connecting arm 76 is pivoted to a second connecting arm 77, of which in turn the other end is freely pivoted to an appendage 79 on the bottom of the member 22. The purpose of the connecting arms 76 and 77 is to maintain the members 22 and 26 in a desired radial orientation at all times.

Supported within the open lower end of the member 26 is an annular bearing member 80 which is held in position by a threaded plug 82. The bearing member 80 is adapted for sliding contact with the outer wall 83 of the member 22.

The substantially unrestricted orifice 42 is located just below the interior plug 72 when the member 22 is in its lowest position with respect to the enclosure 10. A similar location of orifice 42 would be appropriate with embodiment 3.

At the upper end of the enclosure 10, an internal plug 84 is threaded into the open upper end of the enclosure 10, and has an outwardly projecting lip 86 adapted to hold an annular member 87 in place on the end of the enclosure 10. The annular member 87 has an exterior gallery in which is received an annular bearing 88 adapted to contact the cylindrical inner wall 90 of the outer member 26. The cavity 31 is partially filled with oil, and a plurality of lubricating orifices 92 are provided in the annular member 87 to permit the interior wall 90 of the member 26 to be lubricated below the bearing 88.

The head 36 has a stem 93 which is threadedly engaged with the rod 18. The rod 18 is hollow, and is formed integrally with a cap 94 which threadedly engages the member 26. A valve 95 is provided to adjust the pressure of the gas and the volume of the oil inside the shock absorber.

One or more radial, substantially unrestricted apertures 96 are provided in the hollow rod 18 to permit substantially unimpeded communication between the cavity 31 and the interior of the rod 18. It will be appreciated that the interiors of the rods 20 and 18 function as extensions of their associated cavities 32 and 31. This fact permits greater linearity in the displacement-sensitive resistance to closure of the shock absorber, since the pressure, generally speaking, varies inversely as the volume.

Boss 97 and appendage 98 are provided for the purpose of securing the upper end of the shock absorber to the body of the vehicle or aircraft with which it is to be used.

The septum 44 (74) has been referred to as "substantially imperforate," and this term is used because in actual practice with the embodiment of FIGURE 3, the oil in the sub-chamber 46 (FIGURE 3) tends gradually to leak away past the bearings and the associated sealing means, and some way must be provided for restoring this lost oil. By providing a minute leakage pasasge in the septum 44 (that is, a highly restricted orifice), oil from sub-chamber 45, supplied through the lines 50, can pass into sub-chamber 46 to make up for the lost oil. Alternatively, it is conceivable that a separate oil make-up line could be provided through the member 22 to deliver oil to the sub-chamber 46, thereby permitting the septum 44 (74) to be completely imperforate.

Those skilled in the art will appreciate that the three embodiments described above constitute only a few of the many combinations of functions possible at the upper and lower ends of the shock absorber acording to this invention. Table I below will give an idea of the total number of combinations. In the table the letters A to D refer to the following functions:

A. Oleopneumatic shock absorption—both with normal or minimal dashpot action (restricted orifice effect) on closure with the conventional recoil damping on re-extension.

B. Liquid compression shock absorption (either end of FIG. 1 embodiment)—both with normal or minimal dashpot action on closure in conjunction with the conventional recoil damping on re-extension.

C. Hydraulic or pneumatic actuator (upper portion of FIGURE 3 embodiment)—either single or double acting.

D. Hydraulic dashpot with zero or nominal associated gas spring (lower portion of FIGURE 3 embodiment with cavity 32 vented to atmosphere or containing low pressure gas).

TABLE I

| Element at end incorporating "first rod" 18 (upper end in all figures). | A | A | A | A | B | B | B | B | C | C | C | D | D | D | D |
|---|---|---|---|---|---|---|---|---|---|---|---|---|---|---|---|
| Element at end incorporating "second rod" 20 (lower end in all figures). | A | B | C | D | A | B | C | D | A | B | D | A | B | C | D |

While preferred embodiments of this invention have been disclosed herein, those skilled in the art will appreciate that changes and modifications may be made therein without departing from the spirit and scope of this invention as defined in the appended claims.

What I claim as my invention is:

1. A shock absorber comprising:
   an enclosure defining an elongate chamber having a first aperture through one end and second aperture through the other end.
   a first rod extending into said chamber through said first aperture and a second rod extending into said chamber through said second aperture,
   a first member attached to said first rod and mounted on said enclosure for rectilinear reciprocation with respect thereto in a direction parallel to the axis of said first rod, the first rod being in sealed but sliding relation with said first aperture,
   a second member attached to said second rod and mounted on said enclosure for rectilinear reciprocation with respect thereto in a direction parallel to the axis of said second rod, one of said members being mounted to envelop partially and contact slidingly the other of said members, the mounting of said members and said enclosure being such as to resist lateral bending,
   a first head secured to said first rod inside the chamber and fitting snugly but slidably therewithin,
   a second head secured to said second rod inside the chamber and fitting snugly but slidably therewithin,
   a liquid medium filling said chamber,
   a restricted orifice in said first head,
   said second head having means permitting longitudinal displacement of the second head and thus of the second member with respect to the chamber.

2. A shock absorber as claimed in claim 1, in which said means permitting longitudinal displacement of the second head is a restricted orifice through the second head.

3. A shock absorber as claimed in claim 2, in which said second member slidably envelops its end of the enclosure and defines therewith a closed cavity of which the volume is dependent upon the relative positions of the second member and the enclosure orifice means between said chamber and said closed cavity, said closed cavity containing liquid and pressurized gas, the shock absorber being oriented with the second member upwardly such that said orifice means provides communication between the liquid in the closed cavity and the liquid in the chamber.

4. A shock absorber as claimed in claim 3, in which said first member slidably envelops its end of said enclosure and defines therewith a cavity of which the volume is dependent upon the relative positions of the first member and the enclosure.

5. A shock absorber as claimed in claim 4, in which said last-mentioned cavity is closed and contains low-pressure air.

6. A shock absorber as claimed in claim 4, in which said last-mentioned cavity is closed and contains high-pressure air.

7. A shock absorber as claimed in claim 4, in which said last-mentioned cavity is vented to the atmosphere.

8. A shock absorber as claimed in claim 4, in which the enclosure and the first member are cylindrical and are in sealed but sliding contact through two axially spaced annular bearing members, one of the annular bearing members being secured to said enclosure and extending outwardly therefrom to contact the first member, the other of the annular bearing members being secured to said first member and extending inwardly therefrom to contact the enclosure, the enclosure and the first member defining between them an annular space bounded axially by the bearing members, the bearing members being arranged such that said annular space decreases in volume as the first member moves toward the enclosure, a substantially unrestricted orifice in the enclosure wall communicating the chamber with said annular space, said annular space being filled with liquid, the swept cross-sectional area of said annular space being substantially equal to the cross-sectional area of said first rod, such that liquid displaced from said chamber by entry of the first rod can be accommodated by the increasing volume of said annular space.

9. A shock absorber as claimed in claim 8, in which the second member envelops part of the first member, the second member having a cylindrical bore and being in sliding contact with both the enclosure and the first member through two axially spaced annular bearing members, one of said last-mentioned annular bearing members being secured to said enclosure and extending outwardly therefrom to contact the second member, the other of said last-mentioned annular bearing members being secured to said second member and extending inwardly therefrom to contact the first member.

10. A shock absorber as claimed in claim 1, in which the second rod is in sealed but sliding relation with said second aperture, and in which said means comprises:
    two ports opening into said chamber from opposite sides of said second head,
    and a fluid power source for simultaneously drawing fluid in one port and expelling fluid from the other port, and vice versa, whereby to displace the second head with respect to the enclosure.

11. A shock absorber as claimed in claim 10, in which a septum secured to the enclosure intermediate the first head and the second head divides the chamber into two sub-chambers each containing one of the heads, in which said first chamber slidably envelops its end of said enclosure and defines therewith a cavity of which the volume is dependent upon the relative positions of the first member and the enclosure, said cavity being filled with gas under pressure, and in which the enclosure and the first member are cylindrical and are in sealed but sliding contact through two axially spaced annular bearing members, one of the annular bearing members being secured to said enclosure and extending outwardly therefrom to contact the first member, the other of the annular bearing members being secured to said first member and extending inwardly therefrom to contact the enclosure, the enclosure and the first member defining between them an annular space bounded axially by the bearing members, the bearing members being arranged such that said annular space increases in volume as the first member moves toward the enclosure, an unrestricted orifice in the enclosure wall communicating the chamber with said annular space, said annular space being filled with liquid, the swept cross-sectional area of said annular space being substantially equal to the cross-sectional area of said first rod, such that liquid displaced from said chamber by entry of the first rod can be accommodated by the increasing volume of said annular space.

12. A shock absorber as claimed in claim 11, in which said second member slidably envelops its end of the enclosure and part of said first member, the second member being in sliding contact with both the enclosure and the first member through two axially spaced annular bearing members, one of said last-mentioned annular bearing members being secured to said enclosure and extending outwardly therefrom to contact the second member, the other of said last-mentioned annular bearing members being secured to said second member and extending inwardly therefrom to contact the first member.

13. A shock absorber as claimed in claim 11, in which the air in said cavity is under low pressure.

14. A shock absorber as claimed in claim 11, in which the air in said cavity is under high pressure.

15. A shock absorber as claimed in claim 1, in which said second rod is in sealed but sliding relation with said second aperture.

References Cited

UNITED STATES PATENTS

| | | | |
|---|---|---|---|
| 2,392,892 | 1/1946 | Ward | 244—104 XR |
| 2,958,485 | 11/1960 | Eldred | 244—104 XR |
| 3,056,598 | 10/1962 | Conway et al. | |
| 3,082,980 | 3/1963 | Lucien | 244—104 |

MARTIN B. SCHWADRON, *Primary Examiner.*

ROBERT R. BUNEVICH, *Assistant Examiner.*

U.S. Cl. X.R.

188—96; 244—104